(12) United States Patent
Nali

(10) Patent No.: US 6,609,332 B1
(45) Date of Patent: Aug. 26, 2003

(54) ADJUSTABLE PLANT SHADE/PROTECTION APPARATUS

(76) Inventor: Robert L. Nali, 8790 Chase Dr., #27, Arvada, CO (US) 80003

( * ) Notice: Subject to any disclaimer, the term of this patent is extended or adjusted under 35 U.S.C. 154(b) by 0 days.

(21) Appl. No.: 10/145,240

(22) Filed: May 15, 2002

(51) Int. Cl.[7] .............................................. A01G 13/02
(52) U.S. Cl. ........................................................ 47/25.1
(58) Field of Search ................................ 47/25.1, 20.1; 135/26, 20.1

(56) References Cited

U.S. PATENT DOCUMENTS

| | | | | |
|---|---|---|---|---|
| 882,870 | A | * | 3/1908 | Cary ........................... 135/140 |
| 1,018,522 | A | * | 2/1912 | Savage ........................ 135/151 |
| 1,344,132 | A | * | 6/1920 | Hughes et al. ................. 135/26 |
| 1,567,740 | A | * | 12/1925 | Lavagetto .................... 47/20.1 |
| 4,068,673 | A | * | 1/1978 | Bernardi ...................... 160/22 |
| 4,099,344 | A | * | 7/1978 | Ruemeli ...................... 47/19.1 |
| 4,293,162 | A | * | 10/1981 | Pap et al. ............... 297/184.15 |
| 4,836,231 | A | * | 6/1989 | Peterson ....................... 135/98 |
| 4,836,232 | A | * | 6/1989 | De Rosa et al. ............... 135/99 |
| 5,096,257 | A | * | 3/1992 | Clark .................... 297/184.15 |
| 5,339,847 | A | * | 8/1994 | Kanter et al. .................. 135/16 |
| 6,105,594 | A | * | 8/2000 | Diaz ............................ 135/16 |
| 6,405,742 | B1 | * | 6/2002 | Driscoll ........................ 135/96 |

\* cited by examiner

*Primary Examiner*—Charles T. Jordan
*Assistant Examiner*—Jordan M Lofdahl

(57) ABSTRACT

A adjustable plant shade/protection apparatus for shielding a plant from certain weather conditions such as sunlight and strong storms. The adjustable plant shade/protection apparatus includes a shade support assembly including a base tubular member having an open second end and a bore extended therein through the open second end and also having a plurality of diametrically-opposed holes being spacedly aligned along and disposed through a sidewall of the base tubular member, and also including an extension tubular member being adjustably extended in and from the base tubular member and also having a plurality of diametrically-opposed holes being spacedly aligned along and disposed through a side wall of the extension tubular member; and also includes a shade assembly being mounted upon the shade support assembly and being adapted to be disposed over a designated plant.

6 Claims, 5 Drawing Sheets

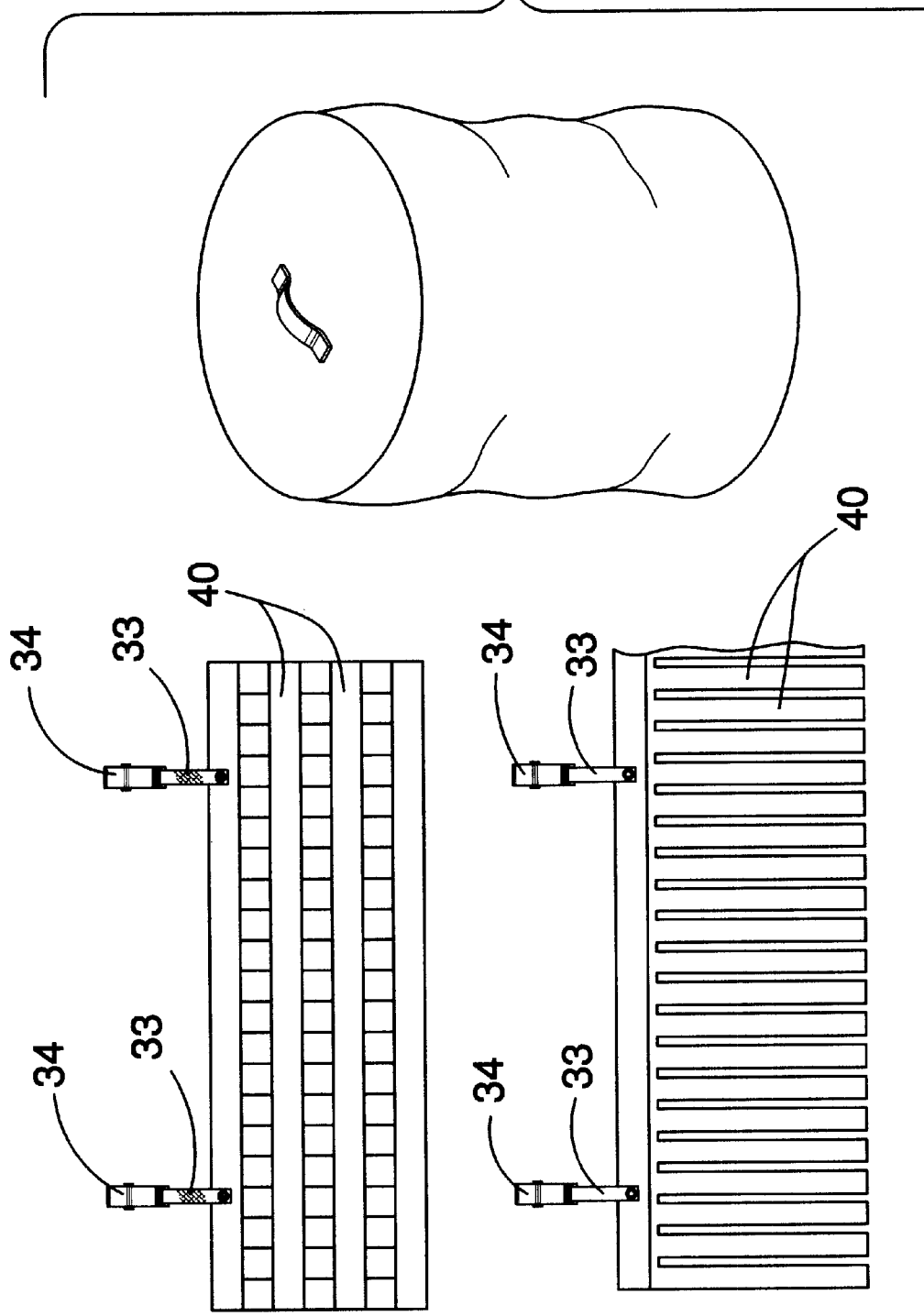

ADJUSTABLE PLANT SHADE/PROTECTION APPARATUS

BACKGROUND OF THE INVENTION

1. Field of the Invention

The present invention relates to plant shades and protectors and more particularly pertains to a new adjustable plant shade/protection apparatus for shielding a plant from certain weather conditions such as sunlight and strong storms.

2. Description of the Prior Art

The use of plant shades and protectors is known in the prior art. More specifically, plant shades and protectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,014,837; 3,383,814; 87,313; 4,955,322; 4,194,319; 2,753,662; and Des. 422,427.

While these devices fulfill their respective, particular objectives and requirements, the aforementioned patents do not disclose a new adjustable plant shade/protection apparatus. The prior art includes stakes and poles and uniquely-structured shades to effectively cover over plants as such.

SUMMARY OF THE INVENTION

The general purpose of the present invention, which will be described subsequently in greater detail, is to provide a new adjustable plant shade/protection apparatus which has many of the advantages of the plant shades and protectors mentioned heretofore and many novel features that result in a new adjustable plant shade/protection, apparatus which is not anticipated, rendered obvious, suggested, or even implied by any of the prior art plant shades and protectors, either alone or in any combination thereof. The present invention includes a shade support assembly including a base tubular member having an open second end and a bore extended therein through the open second end and also having a plurality of diametrically-opposed holes being spacedly aligned along and disposed through a sidewall of the base tubular member, and also including an extension tubular member being adjustably extended in and from the base tubular member and also having a plurality of diametrically-opposed holes being spacedly aligned along and disposed through a side wall of the extension tubular member; and also includes a shade assembly being mounted upon the shade support assembly and being adapted to be disposed over a designated plant. None of the prior art includes the lattice structure for the shade assembly nor the combination of elements which makes it easy and convenient to set up the shade/protection apparatus.

There has thus been outlined, rather broadly, the more important features of the adjustable plant shade/protection apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new adjustable plant shade/protection apparatus which has many of the advantages of the plant shades and protectors mentioned heretofore and many novel features that result in a new adjustable plant shade/protection apparatus which is not anticipated, rendered obvious, suggested, or even implied by any of the prior art plant shades and protectors, either alone or in any combination thereof.

Still another object of the present invention is to provide a new adjustable plant shade/protection apparatus for shielding a plant from certain weather conditions such as sunlight and strong storms.

Still yet another object of the present invention is to provide a new adjustable plant shade/protection apparatus that is easy and convenient to set up anywhere.

Even still another object of the present invention is to provide a new adjustable plant shade/protection apparatus that prevents exposure of the plant to hail and other harmful weather conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of a shade cover assembly of the present invention.

DESCRIPTION OF THE PREFERRED EMBODIMENT

Figure 1:
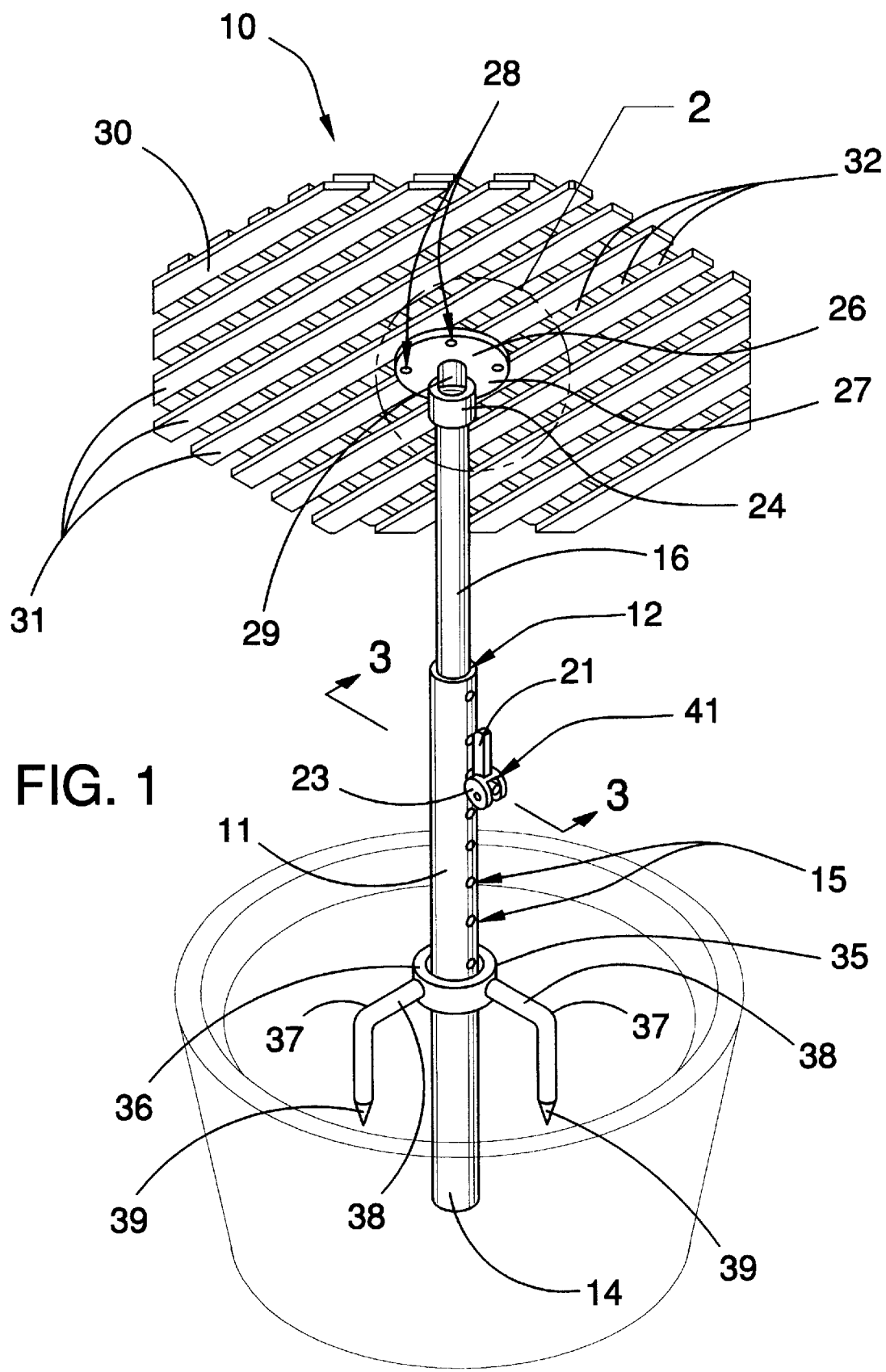
FIG. 1 is a perspective view of a new adjustable plant shade/protection apparatus according to the present invention.
Figure 2:
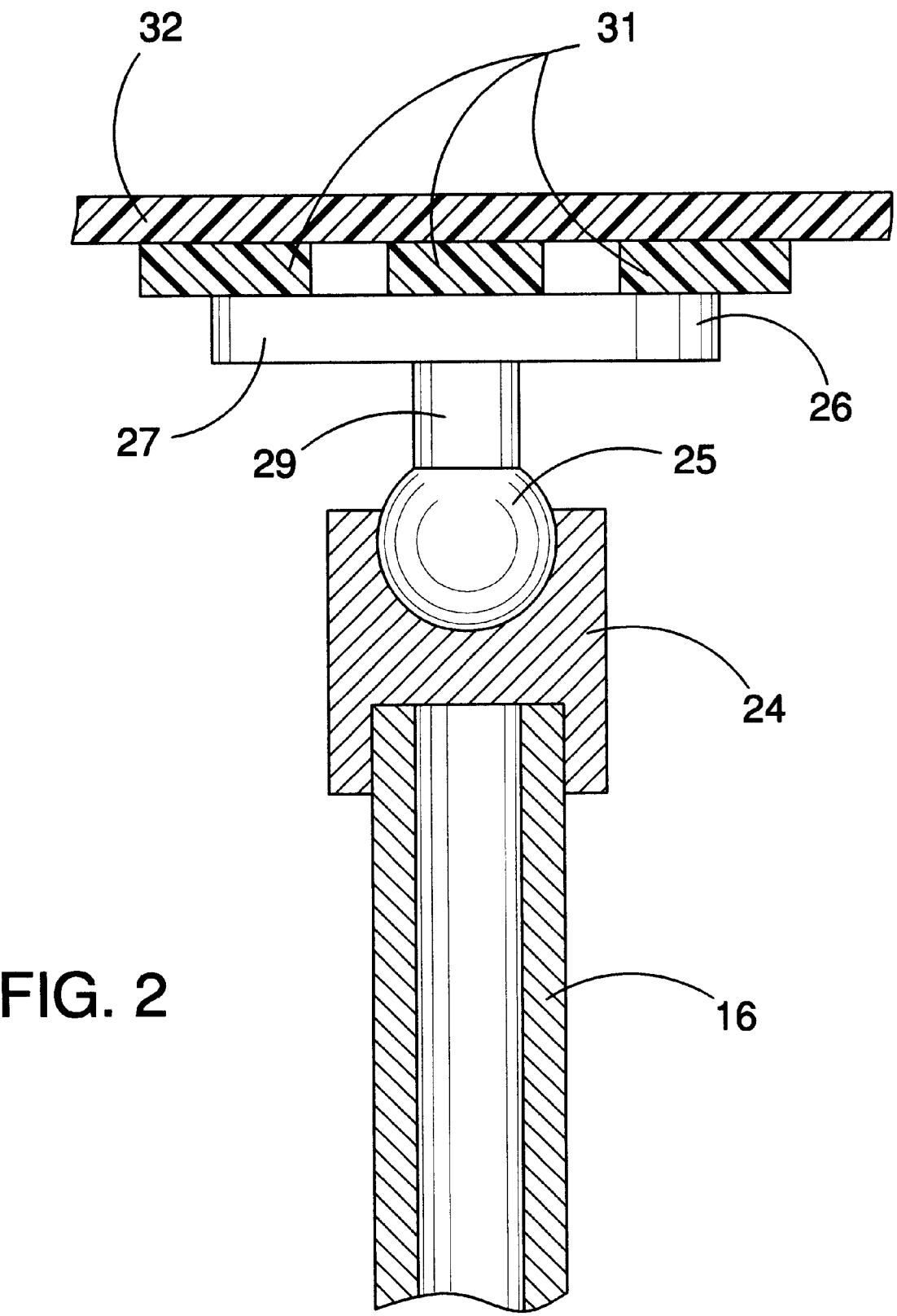
FIG. 2 is a detailed cross-sectional view of the swivel member of the present invention.
Figure 3:
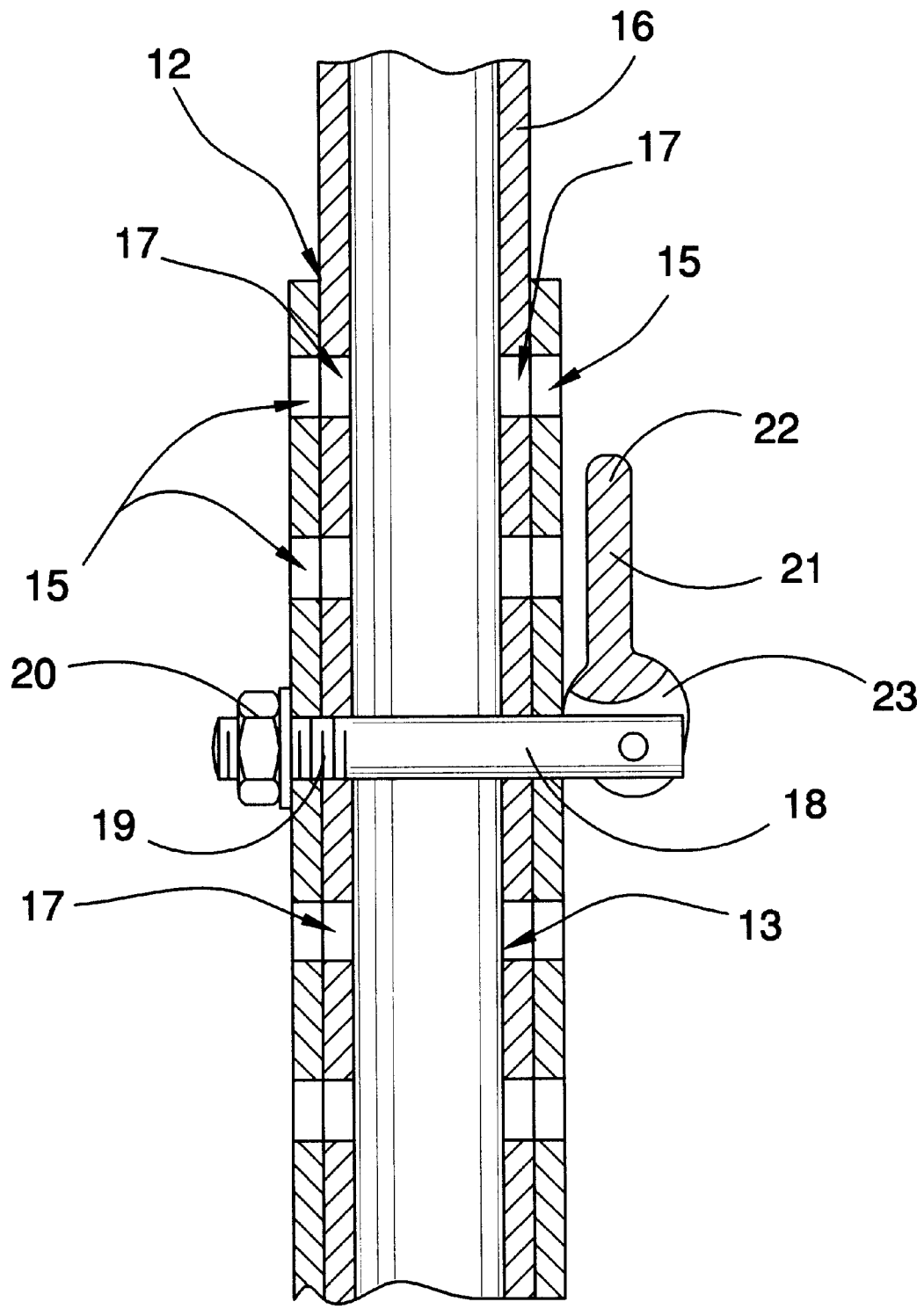
FIG. 3 is a partial cross-sectional view of the telescoping assembly of the present invention.
Figure 4:
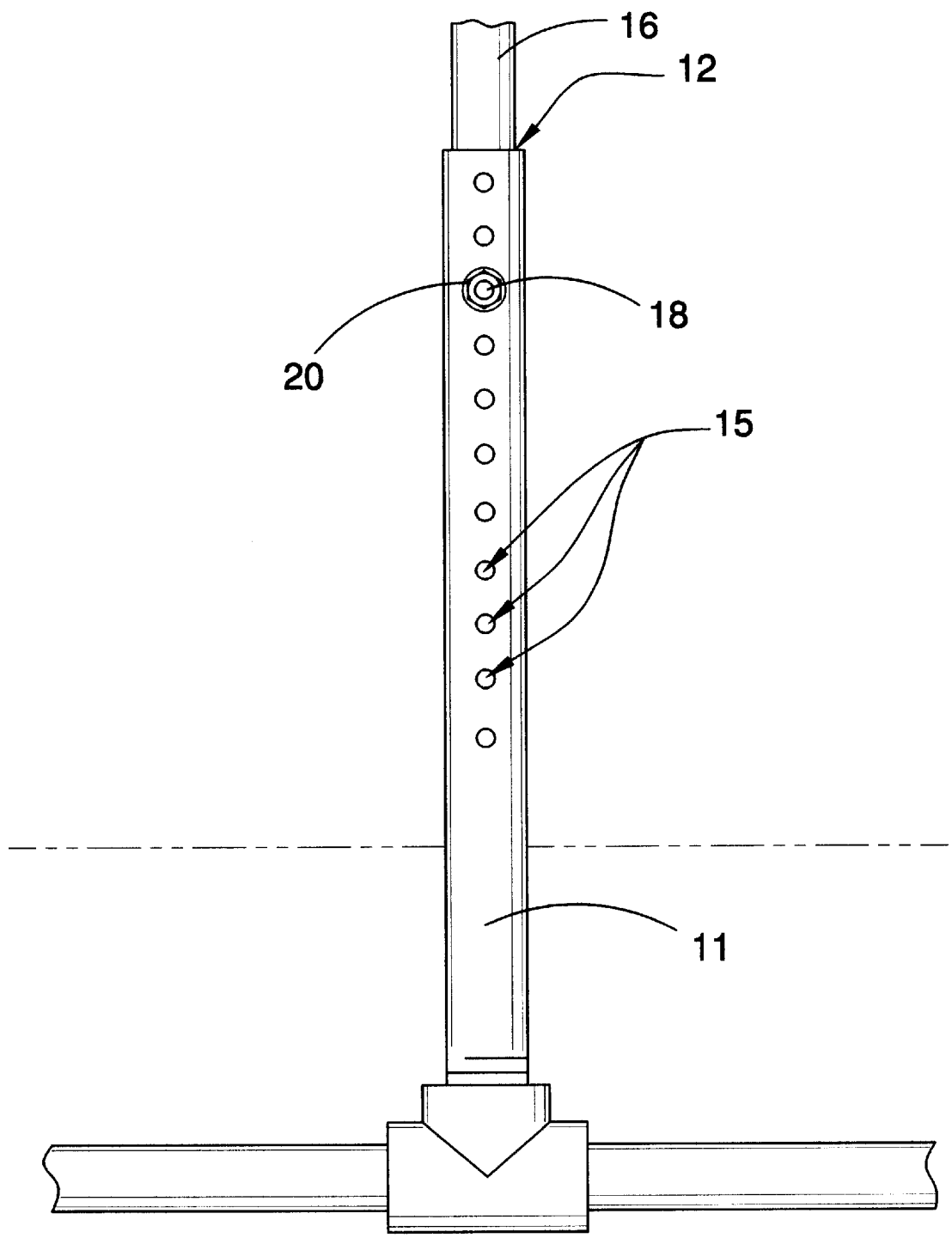
FIG. 4 is a partial side elevational view of a second embodiment of the present invention.

With reference now to the drawings, and in particular to FIGS. 1 through 5 thereof, a new adjustable plant shade/protection apparatus embodying the principles and concepts of the present invention and generally designated by the reference numeral 10 will be described.

As best illustrated in FIGS. 1 through 5, the adjustable plant shade/protection apparatus 10 generally comprises a shade support assembly including a base tubular member 11 having an open second end 12 and a bore 13 extended therein through the open second end 12 and also having a plurality of diametrically-opposed holes 15 being spacedly aligned along and disposed through a sidewall of the base tubular member 11, and also including an extension tubular member 16 being adjustably extended in and from the base tubular member 11 and also having a plurality of diametrically-opposed holes 17 being spacedly aligned along and disposed through a side wall of the extension tubular member 16. The shade support assembly also includes a fastener assembly for fastening the extension tubular member 16 to the base tubular member 11. The fastening assembly includes a pin 18 having a threaded first end portion 19 and being removably received through the holes 15,17, of the base tubular member 11 and the extension tubular member 17, and also includes a nut 20 being removably threaded on the threaded first end portion 19 of the pin 18, and further includes a lever 21 being pivotally and conventionally attached to a second portion of the pin 18. The shade support assembly further includes a swivel assembly being conventionally attached to an end of the extension tubular member 16. The swivel assembly includes a socket 24 being securely and conventionally attached to the end of the extension tubular member 16, and also includes a ball 25 being rollably and securely disposed in the socket 24, and further includes a bracket 26 being securely and conventionally attached to the ball 24. The lever 21 includes an elongate handle portion 22 and cam portion 23 which has a slot disposed therein and which is pivotally and conventionally attached to the second end portion of the pin 18. The bracket 26 includes a plate 27 having a plurality of holes 28 being disposed therethrough, and also includes a stub shaft 29 being securely and conventionally attached to and extending generally perpendicular from the plate 27 with the ball 24 being securely and conventionally attached to an end of the stub shaft 29.

A shade assembly is fastenably mounted upon the shade support assembly and is adapted to be disposed over a designated plant. The shade assembly includes a main shade member 30 being fastened with fasteners to the plate 27, and being a lattice with a plurality of first slat members 31 being spacedly disposed side-by-side and also with a plurality of second slat members 32 conventionally interconnecting the first slat members 31 and being spacedly disposed side-by-side thus forming a plurality of minute apertures through the main shade member 30. The shade assembly also includes shade attachments 40 being detachably attachable to the main shade member 30, and also includes strips of material 33 being conventionally attached to the shade attachments 40, and further includes alligator-type clip members 34 being conventionally attached to ends of the strips of material 33 and being capable of being clamped to the main shade member 30. The shade attachments 30 are generally lattice structures.

As a second embodiment, the shade support assembly further includes an anchor 35 being conventionally and securely disposed about the base tubular member 11. The anchor 35 includes a collar 36 being securely and conventionally attached about the base tubular member 11, and also includes stake members 37 having first ends being attached to the collar 36 and also having tapered second ends for penetrating in a ground. The stake members 37 further have first end portions 38 and second end portions 39 which are angled relative to the first end portions 38.

In use, the user would anchor the base tubular member 11 in the soil proximate to the plant to be covered, and would adjust the height of the extension tubular member 16 so that the main shade member 30 would be disposed above the plant so as to be able to protect it from the harsh elements of the environment, but yet be able to receive its vital nutrients.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the adjustable plant shade/protection apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable plant shade/protection assembly comprising:

a shade support assembly including a base tubular member having an open second a bore extended therein through said open second end and also having a plurality of diametrically-opposed holes being spacedly aligned along and disposed through a sidewall of said base tubular member, and also including an extension tubular member being adjustably extended in and from said base tubular member and also having a plurality of diametrically-opposed holes being spacedly aligned along and disposed through a side wall of said extension tubular member, said shade support assembly also including a fastener assembly for fastening said extension tubular member to said base tubular member, said fastening assembly including a pin having a threaded first end portion and being removably received through said holes of said base tubular member and said extension tubular member, and also including a nut being removably threaded on said threaded first end portion of said pin, and further including a lever being pivotally attached to a second portion of said pin, said shade support assembly further including a swivel assembly being attached to an end of said extension tubular member, said swivel assembly including a socket being securely attached to said end of said extension tubular member, and also including a ball being rollably and securely disposed in said socket, and further including a bracket being securely attached to said ball, said lever including an elongate handle portion and cam portion which is pivotally attached to said second end portion of said pin; and a shade assembly being mounted upon said shade support assembly and being adapted to be disposed over a designated plant.

2. An adjustable plant shade/protection assembly comprising:

a shade support assembly including a base tubular member having an open second end and a bore extended therein through said open second end and also having a plurality of diametrically-opposed holes being spacedly aligned along and disposed through a sidewall of said base tubular member, and also including an extension tubular member being adjustably extended in and from said base tubular member and also having a plurality of diametrically-opposed holes being spacedly aligned along and disposed through a side wall of said extension tubular member, said shade support assembly also including a fastener assembly for fastening said extension tubular member to said base tubular member; said fastening assembly including a pin having a threaded first end portion and being removably received through said holes of said base tubular member and said extension tubular member, and also including a nut being removably threaded on said threaded first end portion of said pin, and further including a lever being pivotally attached to a second portion of said pin, said shade support assembly further including a swivel assembly being attached to an end of said extension tubular member; said swivel assembly including a socket being securely attached to said end of said extension tubular member, and also including a ball being rollably and securely disposed in said socket, and further including a bracket being securely attached to said ball, said bracket including a plate having a plurality of holes being disposed therethrough, and also including a stub shaft being securely attached to and extending generally perpendicular from said plate, said ball being securely attached to an end of said stub shaft; and a shade assembly being mounted upon said shade support assembly and being adapted to be disposed over a designated plant.

3. An adjustable plant shade/protection assembly as described in claim 2, wherein said shade assembly includes a main shade member being fastened with fasteners to said plate, and being a lattice with a plurality of first slat members being spacedly disposed side-by-side, and also with a plurality of second slat members interconnecting said first slat members and being spacedly disposed side-by-side thus forming a plurality of minute apertures through said shade member.

4. An adjustable plant shade/protection assembly as described in claim 3, wherein said shade assembly also includes shade attachments being detachably attachable to said main shade member, and also includes strips of material being attached to said shade attachments, and further includes alligator-type clip members being attached to ends of said strips of material and being capable of being clamped to said main shade member.

5. An adjustable plant shade/protection assembly as described in claim 4, wherein said shade attachments are generally lattice structures.

6. An adjustable plant shade/protection assembly comprising:

a shade support assembly including a base tubular member having an open second end and a bore extended therein through said open second end and also having a plurality of diametrically-opposed holes being spacedly aligned along and disposed through a sidewall of said base tubular member, and also including an extension tubular member being adjustably extended in and from said base tubular member and also having a plurality of diametrically-opposed holes being spacedly aligned along and disposed through a side wall of said extension tubular member, said shade support assembly also includes a fastener assembly for fastening said extension tubular member to said base tubular member; said fastening assembly including a pin having a threaded first end portion and being removably received through said holes of said base tubular member and said extension tubular member, and also including a nut being removably threaded on said threaded first end portion of said pin, and further including a lever being pivotally attached to a second portion of said pin, said shade support assembly further including a swivel assembly being attached to an end of said extension tubular member; said swivel assembly including a socket being securely attached to said end of said extension tubular member, and also including a ball being rollably and securely disposed in said socket, and further including a bracket being securely attached to said ball, said shade support assembly further including an anchor being disposed about said base tubular member; said anchor including a collar being securely attached about said base tubular member, and also including stake members having first ends being attached to said collar and also having tapered second ends for penetrating in a ground, said stake members further having first end portions and second end portions which are angled relative to said first end portions; and a shade assembly being mounted upon said shade support assembly and being adapted to be disposed over a designated plant.

\* \* \* \* \*